UNITED STATES PATENT OFFICE.

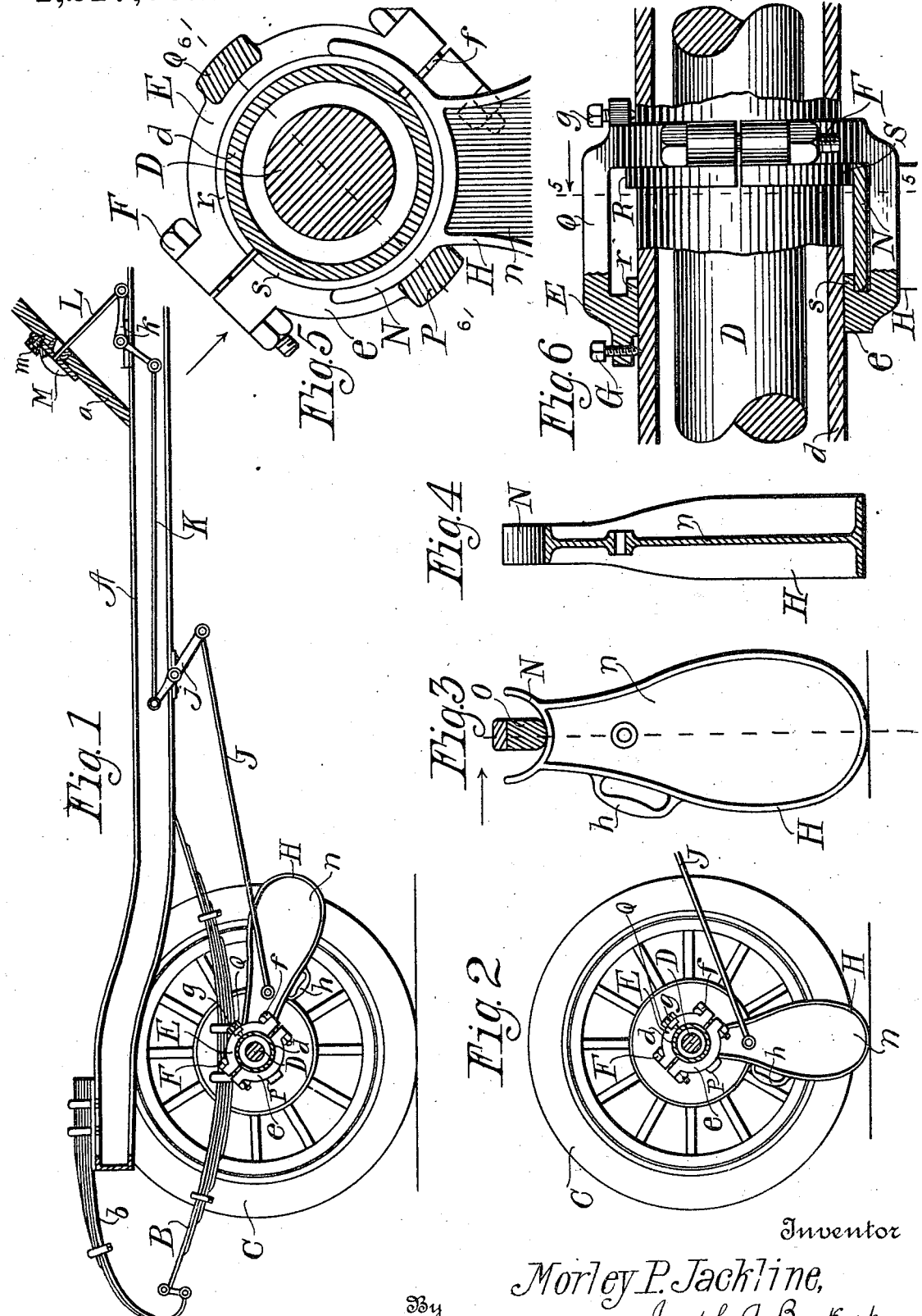

MORLEY P. JACKLINE, OF ATCHISON, KANSAS.

VEHICLE LIFTING-JACK.

1,217,001.

Specification of Letters Patent.   Patented Feb. 20, 1917.

Application filed September 13, 1916.   Serial No. 119,906.

*To all whom it may concern:*

Be it known that I, MORLEY P. JACKLINE, a citizen of the United States, residing at Atchison, in the county of Atchison and State of Kansas, have invented certain new and useful Improvements in Vehicle Lifting-Jacks, of which the following is a specification.

This invention relates to vehicle lifting jacks, and belongs more particularly to that class of devices which are intended to raise one or another wheel of a vehicle, for example, an automobile, by means of the operation of the vehicle itself. This invention comprises a member termed a shoe in the description, and the shoe is pivotally connected with an axle of the vehicle near one of the wheels. Ordinarily, by the aid of certain auxiliary parts, the shoe is held in a raised position, that is to say, its free end is hoisted up sufficiently to clear all usual road obstructions. When it is necessary to use the shoe for the purpose of lifting a wheel to give attention to the tire or for any needed act, the shoe is permitted to swing vertically downward until its foot or free end touches the ground, the arrangement being such that usually the shoe is raised and lowered upon that side of the axle that is toward the front of the vehicle. The length of the shoe is greater than the length of the radius of the wheel, therefore, when the end of the shoe touches the ground the shoe is in a forwardly and downwardly inclined attitude. Now, if the vehicle is moved or drawn forward the shoe, acting against the ground, by a sort of rolling and lifting action raises the wheel upward for a short distance.

The object of this invention is the production of a shoe and of the parts concerned in its pivotal support and in its operation, having special construction and arrangement by which it is believed the operation may be carried out quickly and conveniently, and the part may be readily and cheaply made in particularly durable shape, the whole being always at hand for use at any time.

The construction and arrangement of the parts of this invention are illustrated in the accompanying drawings, of which Figure 1 is a side view of a portion of the frame and running gear of an automobile with this invention applied to the frame and axle. In Fig. 1 the shoe is shown in its raised position. Fig. 2 represents the wheel of the vehicle, and shows the shoe in its vertical or operating position and the wheel raised. Fig. 3 is a side view of the shoe, and Fig. 4 is a vertical section thereof on the broken line 4—4 of Fig. 3. Fig. 5 is a view showing the axle of the vehicle in cross-section on the broken line 5—5 of Fig. 6, and showing also one side of each of the twin clamping members applied to the axle, and the shoe held thereby in its vertical position. Fig. 6 is a view partly in section on broken line 6—6 of Fig. 5, the view being taken in the direction of the arrow in Fig. 5, and both sides or half-collars of each of the clamping members being illustrated. In Figs. 3, 4, 5 and 6 the scale of drawing has been increased to render the drawing clearer and more easily understood.

Throughout the description and drawings, the same letter refers to the same part.

Considering the drawings, in Fig. 1 the vehicle frame A has a footboard $a$ of customary form, also the springs B, $b$, the wheel C, axle D and axle casing $d$. To the axle casing are attached the twin clamping members E and $e$, by means of suitable bolts F and $f$. The clamping member together comprise what may be termed a double collar, and to further hold them in place upon an axle or axle casing there are provided the set screws G and $g$, best shown in Fig. 6.

Pivotally engaging the clamping members is the shoe H, that may or may not have the handle $h$. The handle is useful when the shoe is used by itself, as will be hereinafter explained. As the parts are ordinarily arranged, a connecting rod J is pivotally coupled to the shoe, and the rod is also pivotally joined to the lower end of the lever $j$ that is supported upon the frame A. A second rod K pivotally connects the lever $j$ and the bell-crank lever $k$, and one leg of the bell-crank is connected with the rod L which passes upwardly through the footboard $a$ and terminates in a head M. The head M may if desired be provided with a thumbscrew $m$, by which the head M is releasably secured to the footboard $a$. When the head M is thus secured, the shoe H is held in its raised position, as shown in Fig. 1. The parts just explained and described are convenient and desirable for raising, lowering and securing the shoe in position as stated, but this invention is not restricted to the particular forms and disposition of those parts.

As best set out in Figs. 3 and 4, the shoe H has at the top a concave, semi-circular flange or head N, and it will be noted that side flanges extend downwardly and join together in a rounded bottom flange. A middle web $n$ joins all the flanges, and the flanges and web are most advantageously made in one piece. By means of the handle $h$, the shoe H may be used by itself. It may be placed in a downwardly and forwardly inclined position beneath the axle O of a buggy, the lower end or flange of the shoe being against the ground, and by moving the buggy forward the axle O will be raised into the position shown in Fig. 3. It is believed to be well understood that when the shoe is intended for use by itself to raise buggy wheels or the like, it must have suitable length for the purpose.

Considering Figs. 5 and 6 it will be seen that the clamping members E and $e$, each comprise two semi-circular portions connected by the bridge pieces P and Q. Each clamping member as customarily made is a single piece of metal, and consists of the two sides or half-collars and the bridge piece as shown. Each clamping member has two semi-circular shoulders interiorly and oppositely placed and formed integrally with the other parts. The shoulders for the member E are designated by the letters R and $r$, and those for the member $e$ by letters S and $s$. The concave head or flange N of the shoe has like curvature and fits the shoulders described. When the parts are assembled upon the axle casing $d$, the head N of the shoe is placed between the clamping members and in engagement with the inward shoulders of those members. As best set out in Fig. 5, it will be noted that the upper curved ends of the flange or head N of the shoe H pass between the bridge pieces P and Q and the shoulders. In Fig. 2, the left hand end of the curved head or prong N is shown beneath the bridge piece P, but, it is believed to be clearly discernible from Fig. 2 that, when the shoe H is swung upwardly into its raised position the ends of the head N will be under both bridge pieces. By reason of that construction and arrangement, the head N is at no time free from connection with the clamping members E and $e$, by which it is pivotally supported.

In the operation of this invention, let it be assumed that the parts are arranged as illustrated in Fig. 1, the shoe being in its raised position. Now, it is desired to raise the wheel C in order that the tire and rim may be removed for repairs. The thumbscrew $m$ is released and the shoe permitted to drop with its free end upon the ground a little in advance of the axle D. Now, if the machine be started forward, the shoe will bear upon the ground and be raised into its vertical position as shown in Fig. 2, and the wheel C will be lifted at the same time. In Fig. 5 it will be noted that one of the bridge pieces, P, is arranged to limit the rearward movement of the body of the shoe with respect to the axle. This arrangement is to prevent the shoe from turning too far rearwardly and letting the wheel down again. After the tire has received the needed attention or other repairs have been completed, a slight rearward movement of the frame A will free the shoe from the weight, and pressure of the foot upon the head M exerted by a person seated in the vehicle, will raise the shoe entirely out of the way and into the position set forth in Fig. 1. If need be the thumbscrew may be again set up to hold the shoe against accidental displacement.

Having now described this invention, and explained the mode of its operation, what I claim is:

1. In a vehicle lifting jack, the combination with twin clamping members each having a semi-circular shoulder and a bridge piece, of a removable shoe having a semi-circular top portion constructed to movably fit the shoulders of the said clamping members, the ends of the said semi-circular top portion of the said shoe passing movably between the said shoulders and bridge pieces of the clamping members, and means for releasably holding the said shoe in a raised position.

2. In a vehicle lifting jack, the combination with two clamping members, each of the said members comprising two curved sides connected by a bridge piece, means for securing the said curved sides of different members together, the curved sides having each a curved shoulder passing under the said bridge piece leaving a space between the shoulder and bridge piece, and a movable shoe having a curved top portion constructed to fit the said shoulders and to pass movably through the said spaces between the shoulders and bridge pieces, the said top portion of the shoe being held in engagement with the said shoulders by said bridge pieces.

3. In a vehicle jack, the combination with two clamping members, each of the said members comprising two curved sides connected by a bridge piece, means for securing the said curved sides of different members together, one of the said members having set screws located externally adjacent to the said curved sides of the member for additionally securing the members to an axle, the curved sides having each a curved shoulder passing under the bridge piece leaving a space between the shoulder and the bridge piece, and a movable shoe having a curved top portion provided with upwardly projecting ends constructed to pass movably through the said spaces between the shoulders and bridge pieces, the said top portion of the shoe being held in engagement with said shoulders by said bridge pieces.

4. In a vehicle jack, the combination with an axle, clamping members for engaging the axle, each comprising two curved sides connected by a bridge piece, means for securing the said curved sides of different members together, the curved sides having each a curved shoulder passing under the bridge piece and leaving a space between the shoulder and the bridge piece, and a movable shoe constructed at the top to engage the said curved shoulders, and one of the said bridge pieces being arranged to limit the rearward movement of the body of the said shoe with respect to the said axle.

In testimony whereof I affix my signature.

MORLEY P. JACKLINE.

Witnesses:
 E. J. McMULLIN,
 R. V. WILCOX.